United States Patent [19]

Sink et al.

[11] 4,333,554

[45] Jun. 8, 1982

[54] SELF-ALIGNING CLUTCH PLATE DRIVE APPARATUS

[75] Inventors: William H. Sink, Auburn; Wendell Lane, Kendallville, both of Ind.

[73] Assignee: Dana Corporation, Toledo, Ohio

[21] Appl. No.: 127,718

[22] Filed: Mar. 6, 1980

[51] Int. Cl.³ .......................... F16D 13/50; F16D 3/06
[52] U.S. Cl. ..................................... 192/70.19; 64/10; 192/70.23; 192/70.27; 403/318; 403/356
[58] Field of Search ................. 192/70.19, 70.2, 70.23, 192/70.18, 70.27, 70.28, 70.29, 70.3; 74/63, 69; 64/10, 31; 403/356, 318, 372

[56] References Cited

U.S. PATENT DOCUMENTS

| | | | |
|---|---|---|---|
| 1,171,267 | 2/1916 | Smith | 403/372 X |
| 1,723,886 | 8/1929 | Pfaff | 64/27 NM X |
| 1,928,191 | 9/1933 | Meurs | 192/70.23 X |
| 1,998,613 | 4/1935 | Ford | 192/70.28 X |
| 2,072,117 | 3/1937 | Lewis | 192/105 |
| 2,257,877 | 10/1941 | Binder | 192/70.28 |
| 2,286,694 | 6/1942 | Talbot | 74/69 |
| 2,905,490 | 9/1959 | Trandel | 403/356 |
| 3,048,248 | 8/1962 | Becknell | 192/70.2 X |
| 3,267,750 | 8/1966 | Rosin et al. | 74/69 |
| 3,317,013 | 5/1967 | Smirl | 192/70.18 |
| 3,424,288 | 1/1969 | Sink | 192/70.29 X |
| 3,994,604 | 11/1976 | Visser | 403/318 X |
| 4,033,439 | 7/1977 | Nichting | 192/70.19 X |
| 4,121,438 | 10/1978 | McCullough | 64/31 |

FOREIGN PATENT DOCUMENTS

| | | | |
|---|---|---|---|
| 658462 | 2/1963 | Canada | 192/70.19 |
| 1243234 | 8/1971 | United Kingdom | 403/372 |
| 1504301 | 3/1978 | United Kingdom | 403/372 |

Primary Examiner—Allan D. Herrmann
Attorney, Agent, or Firm—Frank B. McDonald

[57] ABSTRACT

Apparatus for driving a clutch plate includes a drive pin comprising a shank and a drive head rotatably mounted thereon. In a preferred embodiment, an intermediate clutch plate of a two-plate heavy duty clutch is axially but non-rotatably movable with respect to the clutch flywheel. The flywheel contains an axially extending annular flange from which the aforesaid shank fixedly extends radially inwardly. The drive head, rotatably mounted thereon, is disposed within a recess of the clutch plate for driving engagement of the plate. The apparatus provides a self-aligning clutch plate drive system which substantially minimizes the declutching failures experienced in conventional non-self-aligning drive systems. A friction member resiliently holds the drive head to the drive pin shank for ease of handling and installation of the apparatus. Typically, clutch plate drive recesses comprise slots having radially extending walls positioned parallel to the clutch plate axis of rotation. An alternate preferred embodiment of the clutch plate recess utilized herein comprises radially extending walls angularly offset from said axis.

12 Claims, 10 Drawing Figures

SELF-ALIGNING CLUTCH PLATE DRIVE APPARATUS

BACKGROUND

This invention relates to drive members designed for engagement with axially movably driven plates for transmission of torque. More particularly, this invention relates to clutches of heavy-duty design having a flywheel engageable with an intermediate driven plate to transmit torque produced by diesel truck engines and/or other heavy duty prime movers.

Traditionally, the drive systems of such intermediate plates have endured very little flexibility relative to alignment of plate and flywheel coupling. For example, one such drive system is employed in U.S. Pat. No. 3,424,288. That system incorporates a drive pin having a fixed integral head, the head extending into a peripheral slot within a clutch plate for driving engagement thereof. Such a system requires that the head be carefully aligned with the slot during installation of the clutch. The shank of the drive pin is pressed into a receiving bore in the clutch flywheel, and a square is typically used to ensure alignment of the head with the flywheel face. Alternately, a special block mechanism is used for such installation where a large number of such systems are installed, as for example on an assembly line. These efforts are to ensure proper alignment of the head with respect to the radial walls of the slot in the clutch plate upon installation of the latter and are particularly critical because improper alignment can give rise to "dragging" of the clutch plate resulting in incomplete clutch release and/or erratic clutch engagement.

SUMMARY OF THE INVENTION

The apparatus disclosed and claimed herein provides a self-aligning drive system for the coupling and decoupling of a clutch plate with a rotating drive member as, for example, a flywheel. The apparatus eliminates the need for use of squares or special blocks for achievement of alignment during clutch assembly. The apparatus provides a system which not only provides for faster, simpler installation, but also virtually eliminates the aforesaid problems of incomplete clutch release and/or erratic engagement, as suffered in the use of conventional clutch plate drive systems.

In a preferred embodiment, the apparatus includes a drive pin comprising a shank having a drive head rotatably mounted thereon. A driven intermediate clutch plate contains a plurality of recesses in the periphery thereof for driving engagement with a like number of said drive pins extending from a clutch flywheel flange. The flywheel flange comprises an axially extending annular ring affixed to a flywheel directly connected to an engine crankshaft. The intermediate clutch plate is housed medially of the flywheel flange, the shanks of a plurality of drive pins being affixed to and extending radially inwardly of the flange, and into the aforesaid recesses provided in the clutch plate. The drive heads thereon are thus free to swivel on the shanks thus providing a clutch plate drive system having self-aligning capability. In an alternate embodiment the recesses comprise slots having radially extending walls which are angularly offset from the clutch plate axis of rotation.

DETAILED DESCRIPTION OF PREFERRED EMBODIMENTS

Figure 1:
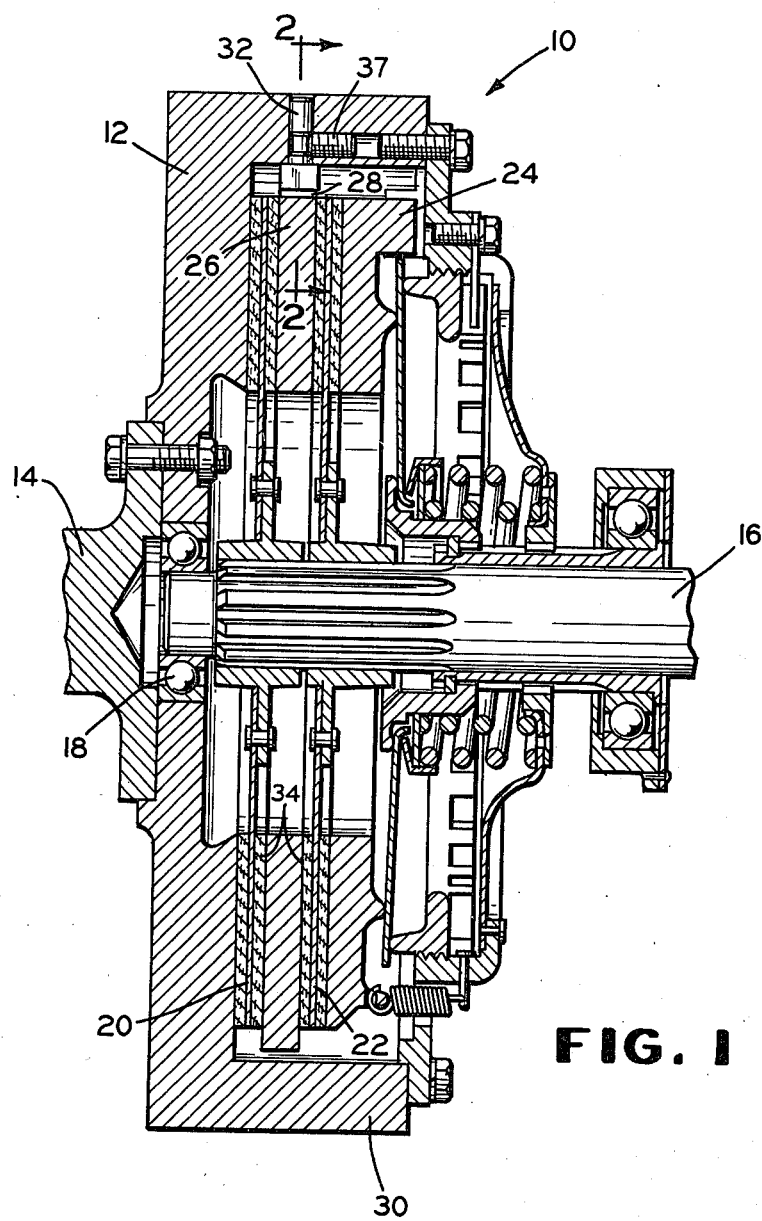
FIG. 1 is a cross section view of a heavy-duty two plate clutch system which incorporates the subject clutch plate drive apparatus.
Figure 2:
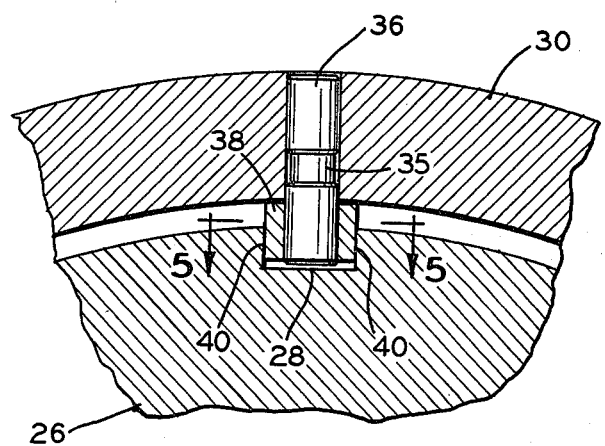
FIG. 2 is a fragmentary cross section taken along lines 2—2 of FIG. 1.

A heavy-duty two-plate clutch 10 incorporating a preferred embodiment of the subject clutch plate drive apparatus is shown in FIG. 1. The clutch 10 includes a flywheel 12 coupled for unitary rotation with a power shaft 14, which extends from an engine or prime mover not shown. As per conventional practice, an output shaft, shown fragmentarily at 16, is piloted in the flywheel 12 at its forward end via bearings 18. A pair of driven friction discs 20 and 22 are splined to the forward end of the output shaft 16 for unitary rotation and relative axial movement on the shaft 16. An axially movable pressure plate 24 is disposed for pressing the discs 20 and 22 into driving engagement with the flywheel 12. A clutch intermediate plate 26 is sandwiched between the discs 20 and 22, the intermediate plate containing recesses or slots 28 (see FIG. 2) for coupling and rotatable engagement thereof with the flywheel 12. For this purpose, the flywheel contains an axially extending annular flange 30 which radially encompasses the driven discs 20 and 22, as well as the pressure plate 24 and intermediate plate 26 (drive members). A plurality of drive pins 32 (FIGS. 1, 2) extend radially inwardly from the flange 30 for registration with slots 28 in the outer periphery of the intermediate plate 26. The intermediate plate is thereby at all times drivingly coupled to the flywheel 12 and via conventional friction facings 34 on discs 20 and 22, which respectively engage either side of the intermediate plate 26, the intermediate plate is designed to carry a portion of the transmitted torque, as will be appreciated by those skilled in the art.

Figure 3:
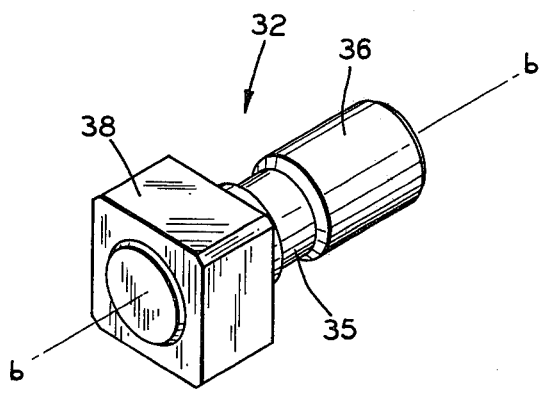
FIG. 3 is a perspective view of a preferred embodiment of the subject clutch plate drive pin.
Figure 4:
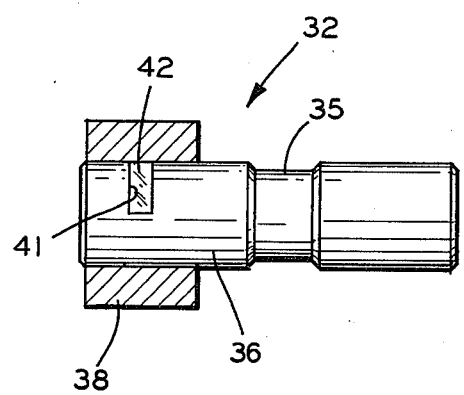
FIG. 4 is a side view of the embodiment of the drive pin of FIG. 3.
Figure 4A:
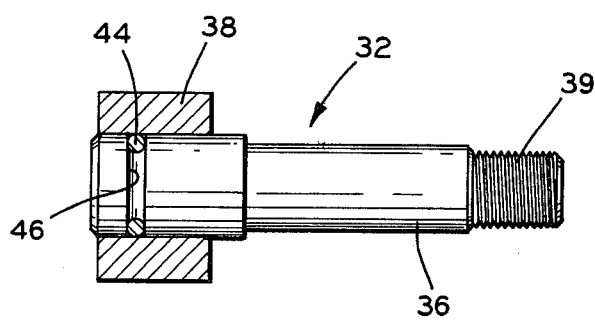
FIG. 4A is an alternate embodiment of the subject clutch plate drive pin.

FIGS. 3 and 4 provide detail of the drive pins 32, which are utilized to slidably couple the intermediate plate 26 with the flywheel flange 30. As will be appreciated, the drive pins 32 must not axially restrain the intermediate plate 26 with respect to the flywheel, as the intermediate plate must be free to slide back and forth, approximately thirty to forty thousandths of an inch, during clutching and declutching of the splined driven discs 20 and 22. The clutch drive pin 32 comprises a shank 36 and a drive head 38, the latter preferably rectilinearly shaped to more satisfactorily bear against the walls 40 (FIG. 2) of the rectilinear slot 28. The drive head 38 is rotatably mounted on the shank 36 for driving engagement of the clutch plate 26 via the walls 40 thereof. A groove 35 is shown (FIGS. 3 and 4) in the shank 36 of the drive pin 32. Set screws 37 (FIG. 1) extend into the groove to fix the shank axially within the flywheel flange 30. Alternatively, the shank 36 may be positioned by lock nut and washer, a threaded extension 39 being shown for that purpose in a second embodiment of the drive pin (FIG. 4A). Upon installation, the threaded extension would protrude beyond the O.D. of the circular flange 30. In addition, the portion of the shank 36 over which the drive head 38 mounts may be of slightly larger diameter than the major shank body portion to provide an interference for achievement of satisfactory location of the shank within the flywheel flange 30. Thus, as the shank is inserted into the flange from the I.D. thereof, the larger diameter portion of the drive head end would provide an automatic stop for proper depth of insertion, whether installation is conducted by hand or machine.

A friction plug 42 of resilient material such as nylon is shown in FIG. 4 extending from a bore 41 in the shank 36 as a means of securing the otherwise unrestricted drive head 38 on the shank 36 for ease of handling during assembly into a clutch unit. The resilient material should be heat resistant to about 500° F. to ensure against its disintegration during subsequent clutch operation. During overhaul of the clutch, it is desirable that the plug should continue to axially retain the drive head 38 on the shank 36.

Figure 4B:
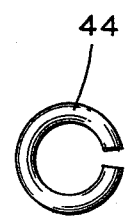
FIG. 4B is a view of a friction ring incorporated in the drive pin of FIG. 4A.

Alternately, a friction ring 44, as shown in FIG. 4B, is utilized to provide friction between the shank 36 and drive head 38 for the same purpose. The ring 44 is positioned in a friction groove 46 in the shank 36, as shown in FIG. 4A.

Figure 5:
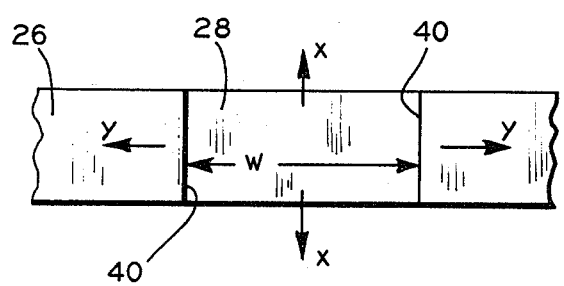
FIG. 5 depicts a recess in a fragmentary top view of a clutch plate, taken along lines 5—5 of FIG. 2, but with the clutch plate drive pin removed therefrom.
Figure 6:
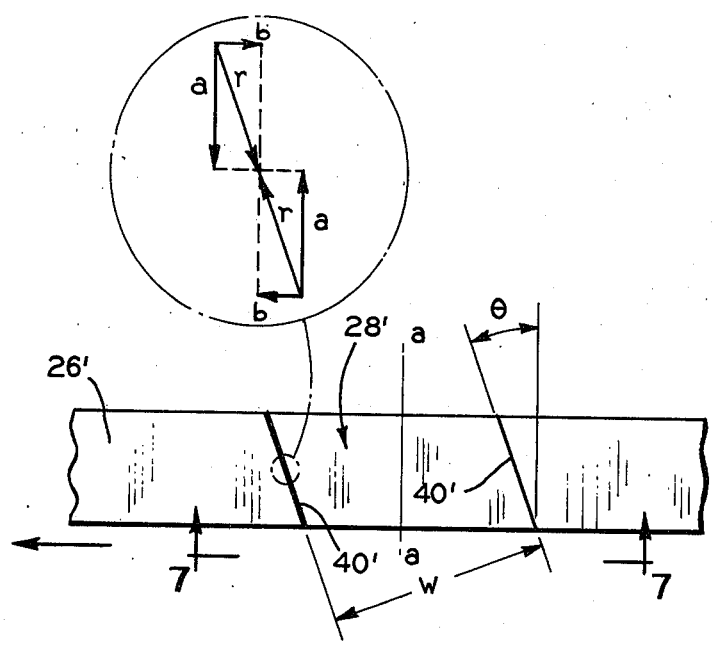
FIG. 6 depicts an alternate recess for use in a clutch plate incorporating the drive pin of the invention, shown in a fragmentary top view of the clutch plate.
Figure 7:
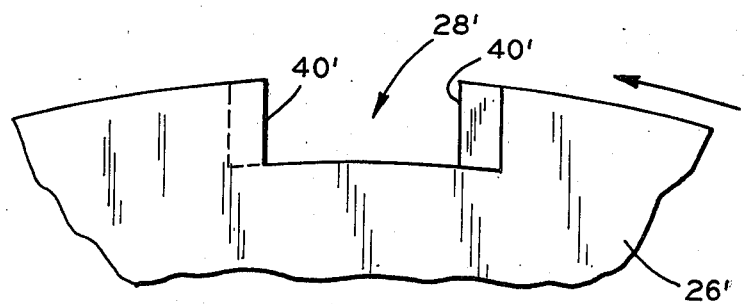
FIG. 7 is a side view of same along lines 7—7 of FIG. 6.

FIG. 5 indicates the directional movements of the slot 28 relative to the drive head 38. Thus the "X" arrows about the rectilinear slot 28 of FIG. 5 depict the axial directions of freedom of movement of the intermediate plate 26 relative to the drive pins 32. The "Y" arrows depict the directions in which the intermediate plate may be accelerated and decelerated via engagement of slots 28 with drive pins 32. An alternate embodiment of the slot 28 is shown at 28' in FIGS. 6 and 7, wherein the radially extending walls 40' thereof are angularly offset from the rotational axis "a—a" of the intermediate plate 26'. Referring to FIG. 6, the angle of offset is preferably within a range of 5 to 15 degrees and enhances the coupling and decoupling characteristics of the clutch by imparting self-de-energizing and self-energizing responses, respectively, to the intermediate plate 26'. Such responses are created by virtue of the combination of relative angular and axial movements during deceleration of the drive heads 38 and slot walls 40', which normally occur during both clutching and declutching operations. Thus during energized declutching, for example, the drivetrain torque causes the intermediate plate 26 to decelerate more slowly than the flywheel 12 and attached flange 30 (which contains the drive heads 38). The angularly offset walls 40' provide a bearing surface against which the drive heads 38 force the intermediate plate away from the flywheel. Upon clutching, the opposite effect is achieved, in that the drivetrain torque produces a de-energizing action on the intermediate plate 26. Thus the plate is decelerated more rapidly than the flywheel via friction drag induced by driven discs 20 and 22. The intermediate plate walls then work against the clutching effort by bearing against the drive heads 38 in a manner so as to resist sliding of the plate 26' toward the flywheel 12.

Making reference to the force vector diagram of FIG. 6, the difference in rotational deaccelerations of each drive head 38 and slot wall 40' creates pairs of equal but oppositely directed force vectors "r" along the angular plane of each wall 40', as shown. Each vector "r" has components "a" and "b", the component "a" being axially directed and, as shown in the declutching mode, tending to axially separate the drive head from the wall.

Although the foregoing describes energized declutching and de-energized clutching, the inventors are aware of instances when energized clutching and de-energized declutching may be more desirable alternatives. The invention as described herein is intended therefore to encompass both alternatives. In FIG. 6, the angle of offset is shown "opened" in the indicated direction of rotation of plate 26'. The latter alternative is achieved simply by inverting the angle of the slot walls 40', thereby achieving a "closed" angle in the direction of rotation of plate 26'.

Regardless of the angle of offset, and whether there is an offset, the width "w" (see FIGS. 5 and 6) of a line perpendicularly drawn between the two parallel walls 40 or 40' represents the approximate suggested width of the slot-engaging portion of the drive head 38 for use therewith, which is preferably of a rectangular configuration (FIG. 2) as viewed along its rotational axis "b—b" (FIG. 2) in order to maximize bearing surfaces against parallel walls 40 and 40'. The dimension of the drive head 38 should, of course, be slightly smaller than width "w", however, to provide for its slidable insertion into the slot 28 or 28', preferably by six to ten thousandths total clearance.

Figure 8:
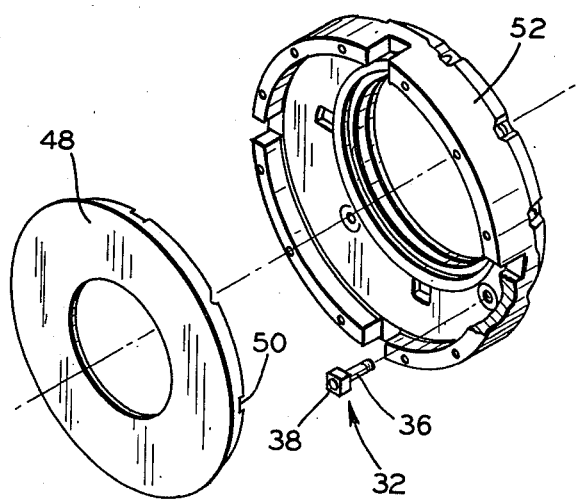
FIG. 8 is an alternate embodiment of a clutch plate drive system which incorporates this invention.

The foregoing described radially inwardly extending embodiment of the drive pin of this invention is but only one of many possible configurations the drive pin may assume within a clutch plate drive system. For example, in FIG. 8, an axially extending drive pin 32 is shown disposed for driving a main clutch pressure plate 48, rather than an intermediate plate. The drive head 38 of the pin engages back-side slots 50, shown therein for rotatable movement of the plate 48 with the clutch cover casting 52, to which the shanks 36 of the drive pins are fixedly attached. Other embodiments may be envisioned and, accordingly, are encompassed by the following appended claims.

What is claimed is:

1. In a clutch having a driven plate axially movable but rotatably fixed with respect to the flywheel, said flywheel comprising a drive pin and means for holding said drive pin; an improvement for driving said driven plate wherein said drive pin comprises a shank fixedly connected to and extending radially inwardly of said holding means, said shank containing a drive head rotatably mounted thereto in driving engagement with said driven plate.

2. The clutch of claim 1 wherein said holding means comprise an axially extending circular flywheel flange which concentrically houses said clutch plate.

3. The clutch of claim 2 wherein said drive head is rectilinearly profiled as viewed along the axis of said drive pin, and wherein said driven plate comprises a rectilinear slot mateably disposed for receiving said drive head.

4. The clutch of claim 3 wherein said drive head aligns itself with said slot of said driven plate whenever said driven plate is axially moved with respect to said flywheel.

5. In a clutch having a driven plate axially movable but rotatably fixed with respect to a flywheel, said flywheel comprising a drive pin and means for holding said drive pin; an improvement for driving said driven plate wherein said drive pin comprises a shank fixedly mounted to and extending from said holding means, said shank containing a drive head rotatably mounted thereto in driving engagement with said driven plate, said driven plate comprising a rectilinear slot mateably disposed for receiving said drive head, wherein said slot further comprises parallel radially extending walls angularly offset from the rotational axis of said driven plate.

6. The clutch of claim 5 wherein said parallel walls are angularly offset in a range of 5 to 15 degrees from the axis of said driven plate.

7. The clutch of claim 6 wherein said shank of said drive pin comprises an annular groove about the circumference thereof for locating said shank within said circular flange.

8. The clutch of claim 6 wherein said shank of said drive pin comprises a threaded extension for locating said shank within said circular flange.

9. The clutch of claim 7 or 8 wherein said shank of said drive pin has a major body portion of smaller diameter than the drive head portion thereof, for providing an interference stop thereon for control of depth of insertion thereof.

10. The clutch of claim 9 wherein said shank of said drive pin contains a bore, the bore containing a friction plug for resilient axial retention of said drive head on said shank.

11. The clutch of claim 9 wherein said shank of said drive pin contains a friction groove, said friction groove containing a friction ring for resilient axial retention of said drive head on said shank.

12. The clutch of claim 11, wherein said shank extends axially into said slot of said driven plate.

* * * * *